United States Patent [19]

Lucas

[11] 3,963,896

[45] June 15, 1976

[54] ROTARY WELDING EQUIPMENT WITH CONSUMABLE ELECTRODE WIRE

[75] Inventor: Corwin E. Lucas, Alliance, Ohio

[73] Assignee: Standard Alliance Industries, Alliance, Ohio

[22] Filed: Feb. 24, 1975

[21] Appl. No.: 552,553

[52] U.S. Cl............................................. 219/125 R
[51] Int. Cl.² ........................................... B23K 9/12
[58] Field of Search ................................. 219/125 R

[56] References Cited
UNITED STATES PATENTS

| | | | |
|---|---|---|---|
| 2,930,883 | 3/1960 | Adamec........................... | 219/125 R |
| 3,215,812 | 11/1965 | Smith.............................. | 219/125 R |
| 3,384,734 | 5/1968 | Jakobsson....................... | 219/125 R |

*Primary Examiner*—E. A. Goldberg
*Attorney, Agent, or Firm*—Frease & Bishop

[57] ABSTRACT

Arc welding equipment having a welding tip mounted on a rotatable spindle in an offset relationship thereto, for making annular welds about the axis of the spindle. A cooling block is operatively connected to the spindle and is connected to a water supply for cooling the spindle and the welding tip. Inert shielding gas is supplied to the welding tip through a bore formed in a portion of the spindle and through a rigid water cooled tube which mounts the welding tip on the spindle. Consumable electrode welding wire is fed from a remote supply reel through the spindle bore and welding tip mounting tube with the inert gas to the welding tip. A commutator is mounted on the spindle and electrically connects the electrode wire in an arc power circuit. A workpiece centering tip is mounted on the end of the spindle and positions the welding tip with respect to the workpiece as the spindle rotates on its axis, with the welding tip forming an annular weld on the workpiece.

19 Claims, 18 Drawing Figures

ROTARY WELDING EQUIPMENT WITH CONSUMABLE ELECTRODE WIRE

BACKGROUND OF THE INVENTION

1. Field of the Invention

The invention relates to arc welding equipment and more particularly to rotatable arc welding equipment for performing automatic arc welding operations for forming annular welds using a consumable electrode wire, and in which cooling fluid is supplied to various portions of the equipment.

2. Description of the Prior Art

There are numerous types, styles and arrangements of welding equipment and tools for automatically performing welding operations on a workpiece, including equipment for performing automatic annular welds.

Certain welding operations, depending upon the material to be joined and the nature of the final product, are more suitable for use with a non-consumable electrode, known as TIG welding. Examples of welding equipment for forming annular welds using such a non-consumable electrode are shown and described in U.S. Pat. Nos. 2,908,805, 3,159,734, 3,350,537, 3,513,286 and 3,780,257. These welder constructions are satisfactory for their intended use and are not confronted with the problem of the supply weld wire wrapping around or being movable with the electrode as it rotates, as is present when using consumable electrode wire.

It is desirable for most automatic welding equipment which is used in continuous production welding, to be provided with cooling fluid at the electrode tip, electrical commutator area, and certain rotating portions of the equipment. This cooling enables the equipment to be run continuously for extended periods of time without generating excess heat, which heat is uncomfortable to the operator and harmful to the welding equipment.

The providing of cooling fluid to welding equipment using a consumable electrode together with the components for the electrode feed wire supply means, heretofore, has increased the complexity and cost of such welding equipment. Prior automatic welding equipment using a consumable electrode weld wire has required mounting the weld wire spool on the machine, such as shown in U.S. Pat. No. 3,215,812 wherein the spool rotates with the welding tip. This arrangement enables large spools of wire to be used (in excess of several hundred pounds) reducing continuous replacement of the wire supply reel. Such equipment, however, must be large and more costly than is desirable for many applications in order to rotatably support the large wire reels.

Other types of welding equipment using a consumable electrode weld wire are hand-held and manually operated, such as shown in U.S. Pat. No. 3,114,830 and Reissue U.S. Pat. No. 26,800. The wire supply for these types of equipment is mounted either on the welder itself in small spools (several pounds only) or is fed from a remote stationary reel to the weld tip. Those constructions using the remotely located reels, present problems to the operator who must continually be cautious to avoid tangling the electrode wire as it moves with the welding tip about the axis of rotation. Such hand-held welders, likewise, are difficult to provide with sufficient cooling fluid, in that the supply lines are cumbersome and add to the difficulty of use and weight of the welder. These hand-held welders also are more costly than desirable, in that sufficient safeguards must be incorporated therein to protect the operator, and to sustain the shocks and repeated handling and movement due to their manual operation.

No known welder construction of which I am aware provides a relatively simple construction which combines the advantages of both hand-held and fixed automatic welding equipment for use in forming annular welds, which use consumable electrode wire supplied from large stationary supply reels in combination with cooling supply means to cool various portions of the welding equipment.

SUMMARY OF THE INVENTION

Objectives of the invention include providing an improved rotary welder construction for forming annular welded joints using a consumable electrode weld wire, in which the wire is supplied to the weld tip from large stationary spools located remotely from the welder, which wire does not rotate with the welder torch or is carried thereon, and in which the weld wire is continually supplied to the weld tip in a manner so as not to interfere with the welding operation or a workman performing the same; providing such a rotary welder construction in which cooling means enables cooling fluid to be supplied continuously to various parts of the equipment, in particular to areas adjacent the welding tip, commutator and centering shaft to enable the welder to be used continually without generating excess heat; providing such a welder construction in which the rotatable weld tip may be adjusted radially and axially to enable the formation of annular welds of various diameters and at various locations with respect to the workpiece; providing such a welder construction having centering means which maintains the axis of rotation of the welding tip in performing an annular welding operation central with respect to the center annulus or circle of the resultant weld to be formed, and in which the centering means is readily replaceable, so as to conform with different workpieces or with the welding operation being performed; providing such a welder construction in which a supply of inert gas is continuously fed to the weld tip in conjunction with the supply of weld wire; and providing such a welder construction which is capable of repeated welding operations by being controlled easily, so that similar welds can be formed to be uniformly the same for mass produced items, in which the construction satisfies all the welding requirements in an extremely simple, safe and efficient manner, and which construction satisfies existing needs and obtains the new results and advantages desired.

These objectives and advantages are obtained by the improved rotary welding equipment, the general nature of which may be stated as including support means; spindle means rotatably mounted on the support means, the spindle means having an open first end and a second end; a bore formed in a portion of the spindle means extending from and communicating with the first end of the spindle means; opening means formed in the spindle means and communicating with the bore of the spindle means; means for rotating the spindle means; workpiece centering means mounted on the second end of the spindle means; a welding tip; means for mounting the welding tip on the spindle means offset from the axis of rotation of the spindle means; means providing a passage for supplying consumable electrode weld wire through the spindle means first end, through the bore and opening means of the spindle means, and through the welding tip mounting means to the weld tip; commutator means mounted on the spindle means for electrically connecting the welding tip in an arc power circuit; fluid cooling means operatively connected to the spindle means and extending to adjacent the welding tip, workpiece centering means, commutator means, and the welding tip for circulating fluid to cool the spindle means, workpiece centering means, commutator means, and weld tip; means for supplying arc shielding gas to the electrode welding tip; the fluid cooling means including sleeve means journaled on the spindle means, and block means journaled on the sleeve means and fixed against rotation with respect to the sleeve means; inlet and outlet cooling fluid lines communicating with the block means; a plurality of fluid passage means formed on the sleeve means for circulating the cooling fluid between the inlet and outlet cooling fluid lines; the welding tip mounting means including tubular conduit means extending through the bore of the spindle means and outwardly through the spindle means opening means and terminating adjacent the workpiece centering means; the welding tip being mounted on the conduit means adjacent the workpiece centering means; and sheath means located within the spindle means and welding tip mounting means to provide the passage means for consumable electrode weld wire.

BRIEF DESCRIPTION OF THE DRAWINGS

A preferred embodiment of the invention — illustrative of the best mode in which applicant has contemplated applying the principles — is set forth in the following description and shown in the drawings, and is particularly and distinctly pointed out and set forth in the appended claims.

Similar numerals refer to similar parts throughout the drawings.

DESCRIPTION OF THE PREFERRED EMBODIMENT

Figure 1:
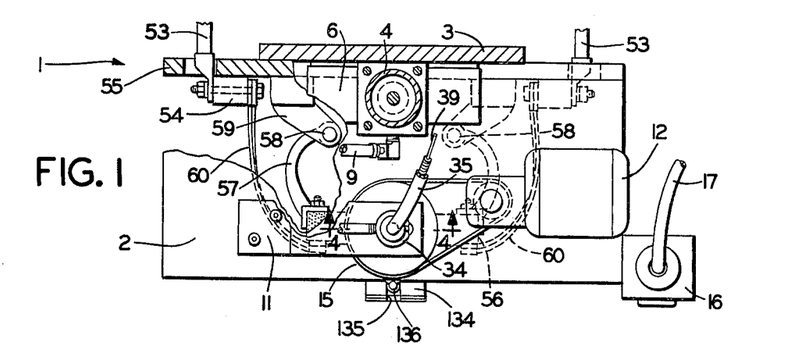
FIG. 1 is a fragmentary top plan view, with portions broken away and in section, of the improved rotary welding equipment.

The improved rotary arc welding equipment is indicated generally at 1 (FIGS. 1, 2 and 3), and is shown mounted on an inverted L-shaped base. Base 2 is slidably mounted for vertical movement along a vertical plate 3 by means of an air cylinder 4. A piston rod 5 is connected to a channel 6, which in turn is attached to base 2 to raise and lower the welding equipment 1 with respect to a workpiece 7. Workpiece 7 is mounted on a table 8 or similar supporting structure preferably beneath welder 1. An air line 9 supplies the air pressure for actuation of cylinder 4.

In accordance with the invention, spindle means indicated generally at 10, is rotatably mounted on base 2 and is positioned thereon by a Z-shaped bracket 11. A drive motor 12 is mounted on plate 2 by a support bracket 13 for rotatably driving spindle means 10 through a pulley 14 and gear belt 15. A control box 16 for welding equipment 1 and motor 12 preferably is mounted adjacent motor 12 on base 2, and is connected to a power supply and other control components by a conductor 17.

Spindle means 10 (FIGS. 4 and 4A) includes a hollow shaft 20 formed with a bore 21 extending generally throughout the length of shaft 20. A pulley hub 22 (FIG. 4) is mounted on a stepped metal sleeve 23 by a set screw 24 with belt 15 being operatively engaged with hub 22 for rotating shaft 20. Sleeve 23 is fixed to the top end of spindle shaft 20 by a set screw 25 (FIGS. 4 and 6) for driving shaft 20. The topmost section 26 of sleeve 23 extends through a hole 27 in Z-shaped bracket 11 and is electrically insulated therefrom by a plastic sleeve 28. Sleeve 28 is fixed with respect to bracket 11 and provides a bearing surface for sleeve end 26, as well as electrically insulating sleeve 23 and spindle means 10 from bracket 11. An insulating washer 29 is mounted between hub 22 and bracket 11 and provides both insulation means and bearing means for hub 22 with respect to bracket 11.

Figures 4, 4A, 5, 6, 7:
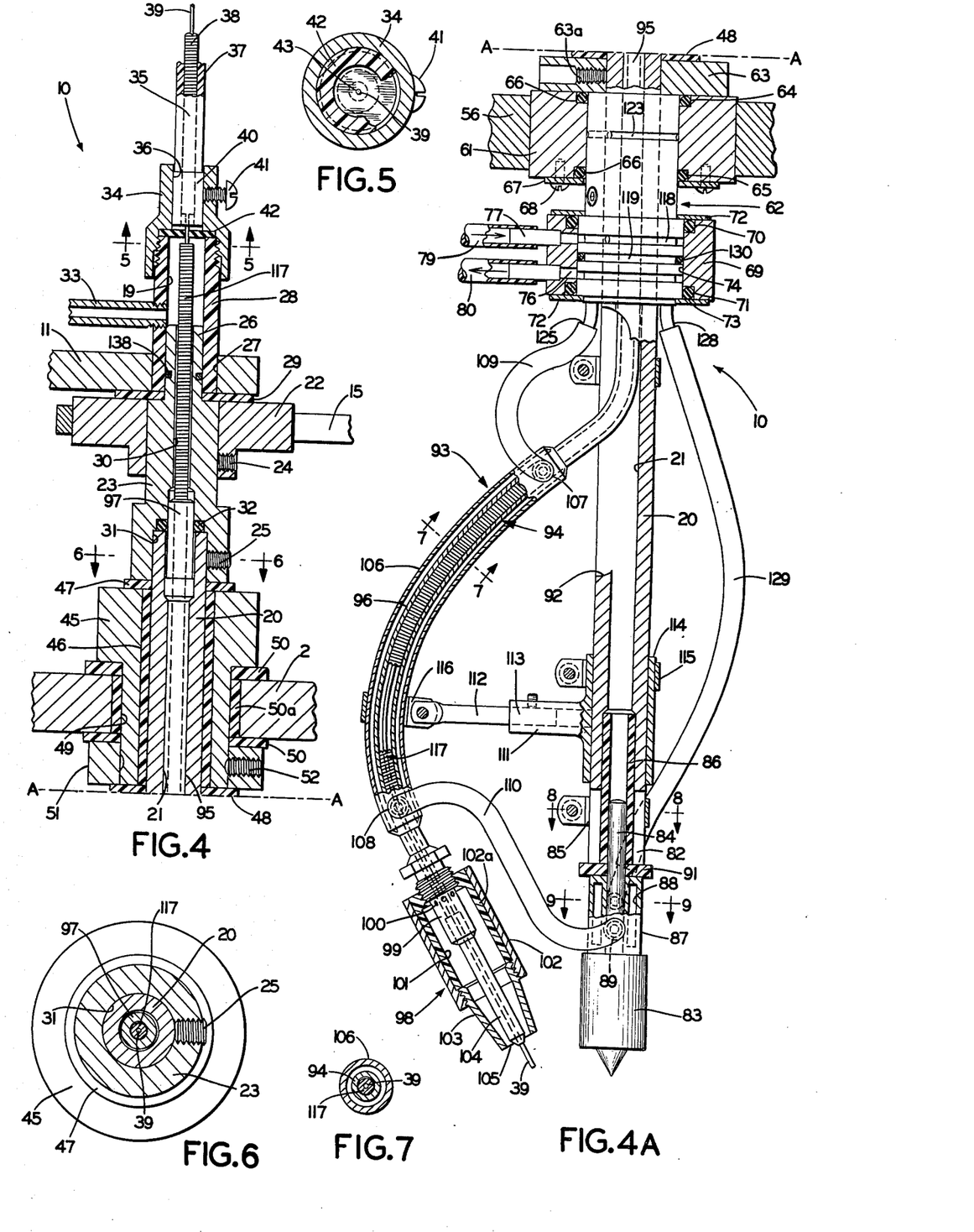
FIG. 4 is an enlarged longitudinal sectional view of the welding torch taken on line 4—4, FIG. 1, showing the upper parts thereof.
FIG. 4A is an enlarged sectional view of the lower parts of the welding torch joined to FIG. 4 on line A—A.
FIG. 5 is an enlarged sectional view of the spindle end cap assembly, taken on line 5—5, FIG. 4.
FIG. 6 is an enlarged sectional view taken on line 6—6, FIG. 4.
FIG. 7 is an enlarged sectional view taken on line 7—7, FIG. 4A.

Sleeve 23 is formed with a bore 30 which axially aligns with and communicates with bore 21 of shaft 20. The upper end of shaft 20 is telescopically received within an enlarged bore area 31 of sleeve 23, and is retained therein by set screw 25. An O-ring 32 provides a seal between sleeve 23 and shaft 20, the purpose of which is discussed below.

An inert gas supply line 33 is threadably engaged with sleeve 28 and communicates with a gas chamber 19 formed within the interior of sleeve 28. Gas line 33 provides a supply of gas to chamber 19 for dispersion to bore 21 of shaft 20 through bore 30 of sleeve 23.

An end cap 34 is threadably mounted on the upper end of sleeve 28 and receives a consumable electrode weld wire supply line 35 through an open top end 36. Supply line 35 preferably includes an outer jacket 37 of an electrical insulating material which surrounds an inner concentric weld wire sheath cable 38. Cable 38 is hollow, and is formed of closely spaced coiled wire to provide a flexible passage through which a consumable electrode weld wire 39 extends for consumption at a welding tip. A metal sleeve 40 is attached to the end of supply line 35 for securing line 35 within the open end 36 of cap 34 by a set screw 41.

A flexible sealing disc 42 is mounted within end cap 34 (FIG. 5) at the top end of sleeve 28. Disc 42 preferably is formed of rubber, neoprene, or the like and is provided with a small central hole 43 for passage of weld wire 39. Disc 42 provides a gas seal for the top end of sleeve 28 preventing escape of the inert gas from chamber 19, yet permits passage of weld wire 39 from supply line 35 into bore 30 of sleeve 28.

Spindle means 10 is rotatably mounted on a fixed journal block 45 (FIGS. 2 and 4) by bearing means, such as a Teflon coated sleeve 46 and a pair of spaced Teflon coated washers 47 and 48. Journal block 45 has a reduced lower portion which extends through a mounting hole 49 in plate 2, and is mounted on plate 2 by a pair of spaced insulating washers 50 and an insulating sleeve 50a. A lower metal retaining ring 51 secures block 45 on plate 2 by a set screw 52.

Electric power for producing the welding arc is supplied to equipment 1 by supply lines 53 (FIGS. 1 and 3) which are connected to a pair of terminal blocks 54 mounted on a vertical plate portion 55 of base 2. A pair of usual carbon or graphite brushes 56 are mounted on plate 55 by spring-biased levers 57 which are pivotally mounted at 58 on clevises 59. Electrical supply leads 60 extend from brushes 56 to terminals 54 to provide the electrical connection with supply lines 53.

Figure 2:
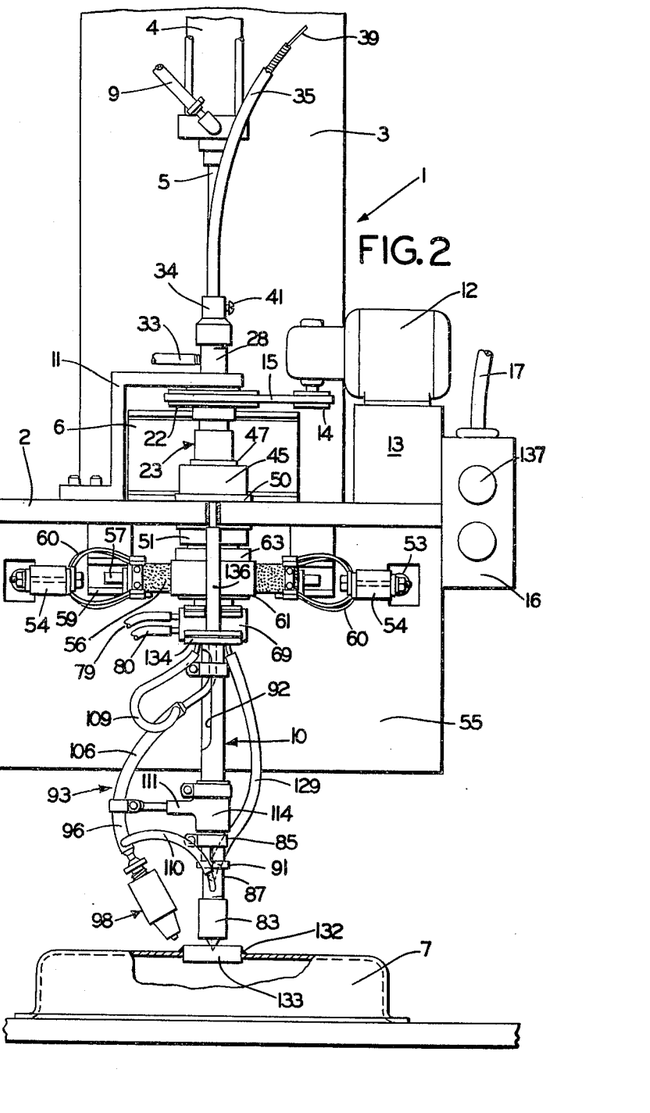
FIG. 2 is a fragmentary front elevational view with portions broken away and in section, of the rotary welding equipment shown in FIG. 1.
Figure 3:
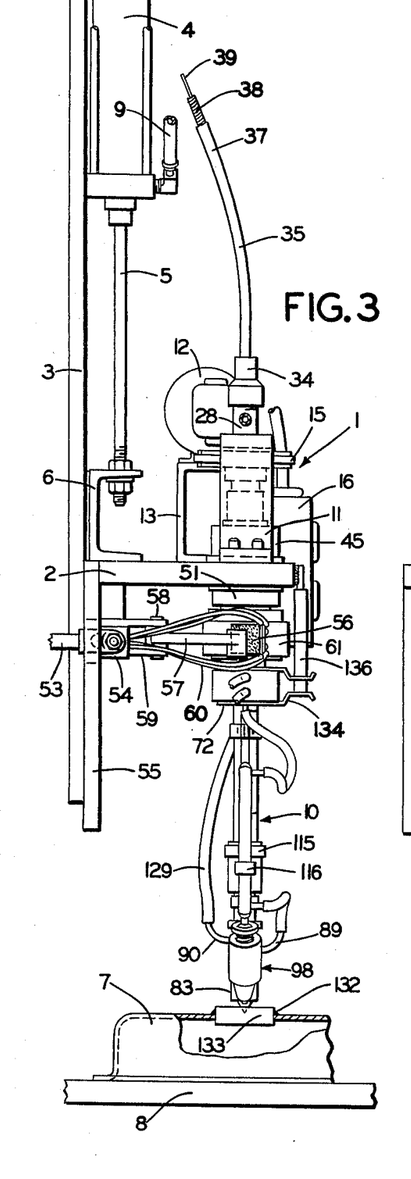
FIG. 3 is a fragmentary left-hand end elevation with portions broken away and in section, of the rotary welding equipment shown in FIGS. 1 and 2.

The electrical welding arc power is transmitted to spindle means 10 through a commutator disc 61 which is mounted on shaft 20 (FIGS. 2 and 4A). Commutator 61 is a ring-like member preferably formed of brass or copper and is journaled on the upper end of a cooling sleeve, which is indicated generally at 62. A lock ring 63 retains commutator 61 on cooling sleeve 62 (FIG. 4A), and is fixed to spindle shaft 20 by a set screw 63a. Upper and lower sealing O-rings 64 and 65, respectively, are mounted in grooves 66 formed in commutator 61 at the top and bottom thereof. A plate 67 is attached by screws 68 to the bottom of commutator ring 61 to retain lower O-ring 65 within lower groove 66.

A rectangular cooling block 69 is journaled on the lower end of cooling sleeve 62 by upper and lower sealing O-rings 70 and 71, respectively. A pair of end plates 72 retain O-rings 70 and 71 within grooves 73 formed in cooling block 69. End plates 72 are formed with outwardly extending flanges 134 (FIGS. 1 and 3) having U-shaped slots 135 formed therein for receiving a rod 136. Rod 136 is welded to base plate 2 and extends through slots 135 to prevent rotation of cooling block 69 with respect to shaft 20.

Cooling block 69 is formed with a central opening 74 in which the lower end of cooling sleeve 62 is seated. Block 69 is formed with a pair of transversely extending holes 75 and 76, (FIG. 10), in which a pair of coupler sleeves 77 and 78, respectively, are mounted. Cooling water inlet and outlet lines 79 and 80 (FIG. 2) are attached to couplers 77 and 78 for continuously supplying cooling water to cooling block 69. Spindle shaft 20 is journaled within and extends through a central bore 81 formed in sleeve 62 (FIGS. 15 and 16) as well as extending through block 69.

A workpiece centering tip 83 (FIG. 4A) is mounted on the lower end of spindle means 10 by telescopic engagement of a shank 84 within bore 21 or shaft 20. Shank 84 is secured within bore 21 by a clamp 85. The lower end of shaft 20 (FIG. 8) preferably is formed with axially extending slots 82 which form four quarter-sections for slidably receiving shank 84 of centering tip 83 therein. A plastic insulating sleeve 86 is located within shaft bore 21 for electrically insulating centering tip 83 from spindle shaft 20.

A water cooled jacket sleeve 87 is mounted on the lower end of shank 84 (FIGS. 4A and 9) adjacent tip 83 and is formed with an annular water chamber 88 therein. A pair of outwardly extending inlet and outlet tube couplers 89 and 90, respectively, are mounted on jacket sleeve 87 and communicate with annular water chamber 88 for circulating cooling water therethrough. Jacket sleeve 87 is electrically insulated from the bottom end of spindle shaft 20 by an insulating washer 91.

Figures 8, 9, 10, 11, 12, 13, 14, 15, 16, 17:
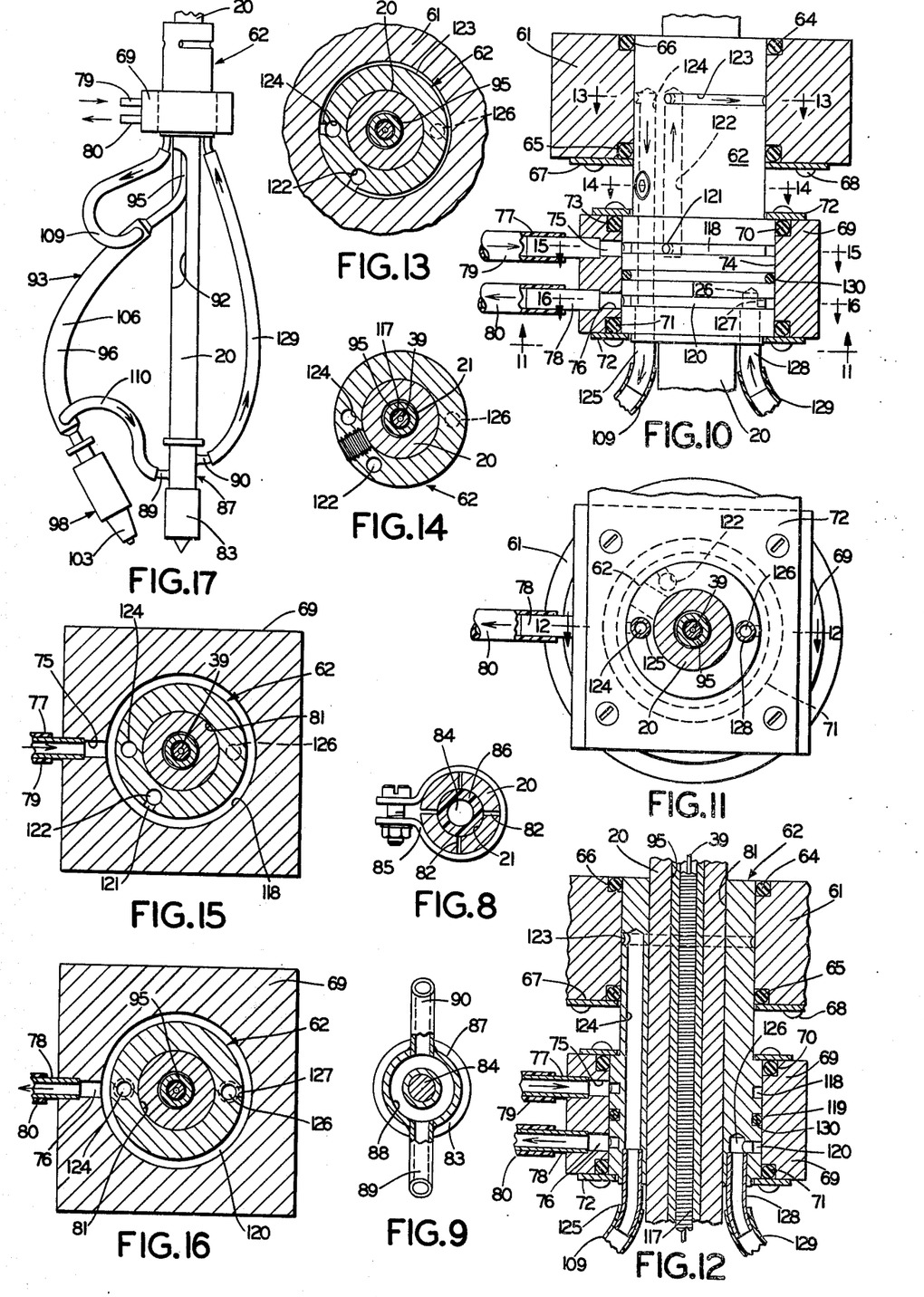
FIG. 8 is an enlarged sectional view taken on line 8—8, FIG. 4A.
FIG. 9 is an enlarged sectional view with portions broken away, taken on line 9—9, FIG. 4A.
FIG. 10 is an enlarged fragmentary front plan view with portions in section, of the cooling block-sleeve and commutator as shown in the upper part of FIG. 4A.
FIG. 11 is a fragmentary sectional view taken on line 11—11, FIG. 10.
FIG. 12 is a fragmentary sectional view taken on line 12—12, FIG. 11.
FIG. 13 is a fragmentary sectional view taken on line 13—13, FIG. 10.
FIG. 14 is a sectional view taken on line 14—14, FIG. 10.
FIG. 15 is a sectional view taken on line 15—15, FIG. 10.
FIG. 16 is a sectional view taken on line 16—16, FIG. 10.
FIG. 17 is a general diagrammatic view of the welding torch and fluid cooling lines.

An elongated slot 92 is formed in the intermediate portion of shaft 20 and communicates with shaft bore 21 (FIGS. 2, 4A and 17). Slot 92 preferably extends from adjacent the bottom plate 72 of cooling block 69 in an axial direction downwardly along shaft 20 to approximately the midpoint area of shaft 20.

In further accordance with the invention, welding tip mounting means, indicated generally at 93, extends throughout the upper portion of shaft bore 21, outwardly through slot 92, and downwardly to the location generally adjacent centering tip 83 (FIGS. 2 and 4A). Mounting means 93 includes a tubular conduit 94 having an upper straight section 95 and a lower curved portion 96. Straight section 95 extends from stepped sleeve 23 (FIG. 4) through bore 21 of shaft 20 and outwardly through slot 92, and merges with curved section 96. A reinforced tip end 97 (FIG. 4) is mounted on the upper end of straight section 95, terminating within stepped sleeve 23 adjacent O-ring 32. Conduit 94 preferably extends continuously from stepped sleeve 23 downwardly through journal block 45, commutator 61, cooling sleeve 62, cooling block 69, outwardly through slot 92, and then terminates adjacent centering tip 83 with a welding tip 98 being mounted on the lower end of conduit 92.

Welding tip 98 (FIG. 4A) is of a usual construction having an inert gas discharge nozzle 99 formed with a plurality of holes 100. The inert gas is discharged through holes 100 into a gas collection chamber 101 formed by a cylindrical open ended sleeve 102. Sleeve 102 is threadably engaged at the upper end with nozzle 99. A cone tip 103 is threadably mounted on the lower end of sleeve 102, with a weld wire guide tip 104 being mounted on the lower end of nozzle 99 and terminating adjacent the open end 105 of cone tip 103. Sleeve 102 is electrically insulated from nozzle 99 by a cylindrical liner 102a of insulating material.

A cooling jacket 106 surrounds a portion of curved section 96 of the mounting conduit 94, and extends from adjacent slot 92 to welding tip 98. Inlet and outlet openings 107 and 108, respectively, are formed on the upper and lower ends of jacket 106 and connect with waterlines 109 and 110. Waterline 110 extends from outlet tube opening 108 to inlet coupler 89 of centering tip cooling sleeve 87.

The welding tip mounting means 93 is adjustably mounted on shaft 20 by a bracket 111 (FIG. 4A). Bracket 111 includes a strut arm 112 which is slidably received within an elongated boss 113 which extends outwardly from a slidably mounted sleeve 114. Sleeve 114 is mounted on shaft 20 for axial sliding adjustment therealong, and is clamped in an adjusted position by a band 115. The outer end of strut 112 is connected by a strap 116 to cooling jacket 106. Mounting bracket 111, thus provides for adjustment of welding tip 98 in both an axial direction along shaft 20 and in a radial direction with respect to shaft 20, to enable the position of welding tip 98 to be adjusted with respect to centering tip 83 and a workpiece 7. Conduit 94 moves freely in an axial direction within bore 21 and slot 92 for making such adjustments.

A sheath cable 117, similar to sheath cable 38, extends from adjacent sealing disc 42 (FIG. 4) downwardly through bore 30 of sleeve 23, and completely throughout the length of and within conduit 94. Cable 117 terminates in abutting relationship with the top end of wire guide tip 104 (FIG. 4A). Sheath cables 38 and 117 provide a continuous enclosed flexible guide passage for movement of weld wire 39 therethrough, which extends from a remotely located spool of weld to welding tip 98, except for the small separation area on both sides of sealing disc 42.

In still further accordance with the invention, the construction of cooling sleeve 62 in combination with cooling block 69, enables circulating fluid, such as water, to be supplied to commutator 61, shaft 20 and welding tip 98. Sleeve 62 (FIGS. 10, 12, 15 and 16) is formed with a plurality of circular grooves 118, 119 and 120. Grooves 118–120 are formed in the lower portion of sleeve 62 which is journaled within cooling block 69.

Upper groove 118 (FIGS. 12 and 15) communicates with hole 75 of cooling block 69 and water inlet coupler 77, whereby cooling water flows through inlet line 79, hole 75 and into groove 118. The incoming water flows completely around the outer circumference of sleeve 62 in groove 118, and then through a radially extending port 121 and into an axially extending opening 122. Opening 122 extends in an axial direction along sleeve 62 and communicates with a fourth peripheral groove 123 (FIG. 13) adjacent commutator disc 61. Groove 123 extends approximately 300° around the outer circumference of sleeve 62 and communicates with a second axially extending opening 124. Opening 124 extends downwardly through sleeve 62 and communicates with waterline 109 by means of an insert coupler 125.

Lowermost circular groove 120 (FIG. 12 and 16) extends completely about the outer circumference of sleeve 62 and communicates with outlet hole 76 of cooling block 69. A third axially extending opening 126 extends upwardly from the bottom of sleeve 62 and communicates with cooling groove 120 by a radially extending port 127. A waterline coupler 128 is mounted on the lower end of cooling sleeve 62 and communicates with axially extending opening 126. Coupler 128 is connected to a waterline 129 which extends from outlet coupler 90 of centering tip cooling jacket 87. An O-ring 130 is mounted within intermediate groove 119 (FIG. 12) to form a watertight seal between the upper and lower portions of cooling sleeve 62 and cooling block 69. O-ring 130 also provides the bearing means between rotating sleeve 62 and fixed cooling 69. Outlet hole 76 of cooling block 69 communicates with lower groove 120 for return of the cooling water through coupler 78 to water outlet line 80.

The improved cooling arrangement of welding equipment 1 enables continuous circulating cooling water to be supplied to commutator 61, shaft 20, welding tip 98 and workpiece centering tip 83 and is summarized below for clarity.

Cooling water or other suitable cooling fluid, is supplied to cooling block 69 from a remote source through inlet line 79. The water enters groove 118 of cooling block 69 through coupler 77 and water inlet hole 75. The water flows in groove 118 around the periphery of sleeve 62 and cools sleeve 62 and block 69. Cooling for these two components is desirable due to the heat which is generated by the frictional engagement between the rotating sleeve 62 and fixed block 69, and from the heavy weld current.

The circulating cooling water flows from groove 118 through port 121 and axially upwardly along sleeve 62 in generally 122 (FIG. 15), providing additional cooling to the upper portion of sleeve 62. The cooling water then flows through groove 123 adjacent commutator disc 61 to provide cooling for commutator 61. Considerable heat is produced in commutator 61 by the frictional engagement of the commutator with carbon brushes 56. Commutator sealing rings 64 and 65 prevent any leakage of cooling water from groove 123 outwardly along sleeve 62 beyond the ends of commutator 61. The cooling water exits from groove 123 into axially extending opening 124 and downwardly throughout the length of sleeve 62. The cooling water flows through coupler 125 and into waterline 109, thus providing additional cooling for sleeve 62.

The cooling water then enters cooling jacket 106 of the welding tip mounting assembly through inlet opening 107, to provide cooling for tubular conduit 94 and weld wire sheath cable 117 located therein. The cooling effect is transmitted generally throughout the length of conduit 94 and cable sheath 117, and is aided by the cooling effect of sleeve 62. the cooling water exits jacket 106 through outlet opening 108 and flows through waterline 110 and into the centering tip cooling jacket 87 through inlet coupler 89. The cooling water circulates about jacket 87 in water chamber 88 and cools workpiece centering tip 83 which becomes heated due to the rotational friction between rotating tip 83 and a stationary workpiece 7, and primarily from the conduction of heat from the workpiece.

The cooling water exits jacket 87 through outlet coupler 90, and flows through waterline 129 into lower grove 120 of cooling sleeve 62 through coupler 128. The cooling water flows in groove 120 around the outer circumference of sleeve 62, and then through cooling block outlet hole 76 and coupler 78 into water outlet line 80. The water preferably is passed through an external water cooling means for removal of the acquired heat, prior to return through inlet line 79.

Another important advantage of the improved welding equipment 1 is the ability to feed weld wire 39 from large stationary reels located remotely from the welding equipment to the weld tip within spindle shaft 20 and the weld tip mounting means. Weld wire 39 is fed automatically by an appropriate control mechanism as spindle means 10 rotates, hrough sheath cables 38 and 117 to weld tip 98 without twisting or rotation of the weld wire about the rotating spindle. Likewise, the supply reel remains stationary and does not need to rotate with the welder heretofore necessary in known welding equipment using a consumable weld wire for the electrode. The weld wire extends axially through the spindle means from end cap 34 and then outwardly through spindle slot 92 to the welding tip. The weld wire is not exposed to an operator of the equipment, nor does an operator need be concerned with the weld wire once the operation of the equipment has started, until the wire supply is exhausted.

The operation of rotary welding equipment 1 is relatively simple and is described below. Weld wire is inserted through sheath cables 38 and 117 from the supply reel until projecting outwardly from guide tip 104. Motor 12 is energized by usual control means and rotates spindle means 10 through belt 15 and pulleys 14 and 22. Prior to energizing motor 12, welding tip 98 has been adjusted by bracket 111 with respect to workpiece 7 to provide for the formation of an annular weld 132 about an insert plug 133 or the like, which is to be welded within workpiece 7. Likewise, a suitable workpiece centering tip 83 has been inserted within shaft 20 and secured therein by clamp 85 to axially align spindle means 10 with the center of the annular weld 132 to be produced by a welding operation.

A weld start button 137 of control box 16 is actuated and electric arc welding power is supplied to brushes 56 for transmission to the weld and weld wire through commutator 61. Likewise, weld wire 39 is fed at a predetermined linear speed to welding tip 98 for formation of an annular weld 132. Inert gas also is supplied simultaneously with the operation of the welding equipment through inlet line 33 to end cap gas chamber 19 which then flows through conduit 94 and into gas chamber 101 at the welding tip. Sealing disc 42 and an 0-ring 138 which is mounted on the reduced upper end 26 of sleeve 23 (FIG. 4) prevents escape of the inert gas from gas chamber 19. 0-ring 32, likewise prevents escape of the gas from within the bore of the spindle means. Cooling water preferably is continuously supplied to the welding equipment and is controlled by a separate control means in order to provide the necessary cooling of the equipment before, during and after each welding operation.

Appropriate timing control mechanism preferably is provided whereby actuation of start button 137 on box 16 will rotate the spindle means 10 and the weld tip 98 throughout one or more revolutions to form the desired annular weld 132. The control mechanism wil automatically deenergize the welding equipment after completion of the required number of revolutions. The operator then raises equipment 1 by actuation of air cylinder 4 for replacement of the welded workpiece 7 with another workpiece 7 followed by the subsequent actuation of the air cylinder for lowering spindle means 10. Centering tip 83 insures the proper positioning of the workpiece 7 with respect to welding tip 98. The operator then depresses start button 137 to begin a second automatic welding operation.

Rotary welding equipment 1 has a number of important advantages and features, the combination of which are not believed present in any known welding equipment. Equipment 1 is a relatively simple and inexpensive construction in contrast to known welding equipment and is assembled from and includes a considerable number of readily available parts and components eliminating the need of expensive manufactured components. This enables the equipment to be assembled and disassembled easily and conveniently for rapid and inexpensive maintainence, and provides a construction which is durable in operation and use.

Another advantage of the improved welding equipment is the circulation of a cooling fluid to areas adjacent the commutator, welding tip, workpiece centering tip and rotating spindle to prevent build up of excess heat. Such cooling enables continuous production welding to be carried out by the improved equipment. Another important advantage is the supplying of the consumable weld wire from large remotely located stationary reels, axially through the spindle means and then to the welding tip without twisting of the weld wire about the spindle or exposure of the weld wire for contact by an operator. Still another advantage is the ability to adjust welding tip 98 in both axial and radial directions with respect to spindle means 10 to form welds of various diameters.

Accordingly, improved welding equipment 1 provides an effective, relatively inexpensive, safe and sturdy, automatic rotary welding equipment for forming annular arc welds using a consumable electrode wire supplied from large remotely located stationary reels, and which construction eliminates difficulties encountered with prior devices, achieves the stated objectives and solves existing problems in the art.

In the foregoing description certain terms have been used for brevity, clearness and understanding, but no unnecessary limitations are to be implied therefrom beyond the requirements of the prior art, because such words are used for descriptive purposes herein and are intended to be broadly construed.

Moreover, the embodiment of the improved construction illustrated and described herein is by way of example, and the scope of the present invention is not limited to the exact details of the construction shown or described.

Having now described the features, discoveries and principles of the invention, the manner in which the rotary welding equipment is constructed, assembled and operated, the characteristics of the new construction, and the advantageous, new and useful results obtained; the new and useful structures, devices, elements, arrangements, parts and combinations are set forth in the appended claims.

I claim:

1. Rotary welding equipment including support means; spindle means rotatably mounted on the support means, said spindle means having an open first end and a second end; a bore formed in a portion of the spindle means extending from the open first end of the spindle means; opening means formed in the spindle means and communicating with the bore of the spindle means; means for rotating the spindle means; workpiece centering means mounted on the second end of the spindle means; a welding tip; means for mounting the welding tip on the spindle means offset from the axis of rotation of the spindle means; means providing a passage for supplying consumable electrode weld wire through the spindle means first end, through the bore and opening means of the spindle means, and through the welding tip mounting means to the welding tip; commutator means mounted on the spindle for electrically connecting the welding tip in an arc power circuit; fluid cooling means operatively connected to the spindle means and extending to at least adjacent the welding tip for circulating fluid to cool the welding tip and to cool the spindle means; and means for supplying arc shielding gas to the welding tip.

2. The welding equipment defined in claim 1 in which the fluid cooling means also extends adjacent to the workpiece centering means and the commutator means for circulating fluid to cool the workpiece centering means and the commutator means.

3. The welding equipment defined in claim 1 in which the fluid cooling means includes sleeve means journaled on the spindle means and rotatable with the spindle means, and block means journaled on the sleeve means and fixed against rotation with respect to the sleeve means; in which inlet and outlet cooling fluid lines communicate with the block means; and in which a plurality of passage means are formed on the sleeve means for circulation of the cooling fluid in the passage means to cool the spindle means.

4. The welding equipment defined in claim 3 in which the sleeve means includes first and second ends; in which the block means is journaled on the sleeve means adjacent the first end and in which the commutator means is journaled on the sleeve means adjacent the second end; in which the cooling fluid passage means includes at least first, second and third circumferentially extending grooves formed in the sleeve means; in which said first and second grooves are located adjacent the first sleeve end and communicate with the inlet and outlet cooling fluid lines, respectively, of the block means; and in which the third groove is located adjacent the second sleeve end and communicates with the commutator means.

5. The welding equipment defined in claim 4 in which the cooling fluid passage means further includes a pair of axially extending openings formed in the sleeve means; in which one of said axial openings extends between and communicates with the first and third grooves to supply cooling fluid from the inlet cooling fluid line to adjacent the commutator means; in whcih first cooling fluid line means extends between the cooling sleeve means and welding tip; and in which the other of said axial openings extends between the third groove and the first cooling fluid line means to circulate the cooling fluid from adjacent the commutator means through the sleeve means to adjacent the welding tip.

6. The welding equipment defined in claim 5 in whcih second cooling fluid line means extends from adjacent the welding tip and communicates with the first groove of the sleeve means for circulation of the cooling fluid adjacent the welding tip and subsequent discharge of the cooling fluid through the outlet cooling fluid lines at the cooling block.

7. The welding equipment defined in claim 1 in which the welding tip mounting means includes tubular conduit means; in which said conduit means extends through the bore of the spindle means and outwardly through the spindle means opening means and terminates adjacent the workpiece centering means; in which the welding tip is mounted on an end of the conduit means adjacent the workpiece centering means; and in which sheath means extends through the conduit means from adjacent the first end of the spindle means to adjacent the welding tip to provide the passage means for a consumable electrode weld wire.

8. The welding equipment defined in claim 7 in which the weld wire sheath means is a hollow, flexible coil-like cable member.

9. The welding equipment defined in claim 7 in which jacket means is mounted on a portion of the tubular conduit means adjacent the welding tip; and in which inlet and outlet cooling fluid supply lines communicate with the jacket means for circulating fluid through the jacket to cool the welding tip mounting means and the welding tip.

10. The welding equipment defined in claim 7 in which bracket means extends between the conduit means and the spindle means for adjustably positioning the welding tip with respect to the workpiece centering means.

11. The welding equipment defined in claim 1 in which the workpiece centering means includes a shank and a centering tip; in which the shank is telescopically received within the second end of the spindle means; in which cooling fluid jacket means is journaled on the centering means shank; and in which inlet and outlet cooling fluid supply lines communicate with the jacket means for circulating fluid through the jacket means to cool the workpiece centering means.

12. The welding equipment defined in claim 1 in which a non-rotatable end cap assembly is journaled on the first end of the spindle means and forms a chamber within the end cap assembly; in which the bore of the spindle means communicates with said chamber through the open first end of the spindle means; in which a gas supply line communicates with the end cap chamber for supplying arc shielding gas to said chamber; and in which said gas is supplied to the welding tip from the chamber through the spindle means bore and the welding tip mounting means.

13. The welding equipment defined in claim 12 in which the end cap assembly is formed with an end opening; in which a flexible sealing disc is mounted within the end cap assembly across the end opening to prevent escape of gas through said opening; and in which said sealing disc is adapted to permit passage of a weld wire through the disc and end cap opening and into the bore of the spindle means.

14. The welding equipment defined in claim 1 in which the support means includes bearing means rotatably supporting the spindle means; in which said bearing means and the commutator means communicate with the spindle means intermediate the spindle means first end and the opening means of the spindle means; and in which the electrode weld wire passage means extends from the first end of the spindle means through the spindle means bore and communicates with the welding tip mounting means at the spindle means opening means whereby an electrode wire is supplied linearly through the bearing means to the welding tip.

15. Rotary arc welding equipment construction for forming annular welds on a workpiece including support means; spindle means rotatably mounted on the support means; the spindle means having first and second ends and an axially extending bore formed in a portion of the spindle means adjacent the first end; transversely extending opening means formed in the spindle means and communicating with the bore; means for rotating the spindle; workpiece centering means mounted on the second end of the spindle means; a welding tip; means for mounting the welding tip on the spindle means for rotation with the spindle means and offset from the axis of rotation of the spindle means; the welding tip mounting means incuding conduit means having at least a straight section and an offset section; the conduit means straight section extending through the spindle means bore, with the offset section extending through the spindle opening means and along the spindle means to adjacent the welding tip; sheath means mounted within the conduit means and the bore of the spindle means providing a passage for supplying consumable electrode weld wire to the welding tip; commutator means mounted on the spindle means for rotation with the spindle means; brush means mounted on the support means and engagable with the commutator means for electrically connecting the welding tip in an arc power circuit; fluid cooling means including sleeve means journaled on the spindle means and a cooling fluid supply block journaled on the sleeve means and fixed against rotation with respect to the sleeve means; cooling fluid inlet and outlet ports formed in the supply block for communication with a remote supply of cooling fluid; passage means formed in the sleeve means for circulating cooling fluid adjacent to the spindle means to cool the spindle means; inlet and outlet openings formed in the sleeve means and communicating with the passage means; fluid cooling lines extending between the inlet and outlet openings of the sleeve means and adjacent the welding tip for circulating cooling fluid adjacent to the welding tip; and gas inlet means communicating with the spindle means bore and the conduit means for supplying arc shielding gas to the welding tip through the spindle means bore and conduit means.

16. The construction defined in claim 15 in which the commutator means is journaled on the sleeve means; and in which a portion of the passage means of the sleeve means extend axially along the sleeve means to adjacent the commutator means for supplying cooling fluid adjacent to the commutator means.

17. The construction defined in claim 15 in which jacket means is mounted on the spindle means adjacent the workpiece centering means; and in which the fluid cooling line from the inlet and outlet openings of the sleeve means also extends to and communicates with said jacket means for supplying cooling fluid to adjacent the workpiece centering means.

18. The construction defined in claim 15 in which the weld wire sheath means is a flexible, hollow member.

19. The construction defined in claim 15 in which the end cap assembly is non-rotatable with respect to the spindle means; in which a gas chamber is formed within said end cap assembly and communicates with the bore of the spindle means; in which the gas inlet means communicate with the gas chamber; and in which flexible sealing means is mounted within the gas chamber and is adapted to permit passage of an electrode weld wire through said sealing means and prevent escape of the shield gas through the sealing means.

* * * * *